United States Patent [19]
Nagashima et al.

[11] 3,811,228
[45] May 21, 1974

[54] METHOD AND APPARATUS FOR CONTROLLING THE ACCURACY OF MACHINING OF A MACHINE TOOL

[75] Inventors: Kazuo Nagashima; Tadahiro Ono, both of Numazu, Japan

[73] Assignee: Toshiba Machine Co., Ltd., Tokyo, Japan

[22] Filed: Dec. 28, 1971

[21] Appl. No.: 213,112

[30] Foreign Application Priority Data
Dec. 29, 1970 Japan.............................. 45-130284
Dec. 29, 1970 Japan.............................. 45-130285

[52] U.S. Cl................ 51/49, 51/165.71, 51/165.87, 51/289 R
[51] Int. Cl.............................................. B24b 5/00
[58] Field of Search.......... 51/165 R, 165.71, 165.8, 51/165.87, 139, 35, 49, 289

[56] References Cited
UNITED STATES PATENTS

| | | | |
|---|---|---|---|
| 3,524,285 | 8/1970 | Rutt................................ | 51/139 X |
| 3,415,017 | 12/1968 | Murray............................ | 51/139 X |
| 3,089,287 | 5/1963 | Dilks................................ | 51/35 |
| 3,354,587 | 11/1967 | Ianis................................ | 51/35 |

*Primary Examiner*—Harold D. Whitehead
*Attorney, Agent, or Firm*—Sughrue, Rothwell, Mion, Zinn & Macpeak

[57] ABSTRACT

A method of controlling a machine tone to improve the accuracy of machining which has the steps of detecting the cutting power of a machine tool, comparing the value of the detecting cutting power with a predetermined value of a in-feed power, and controlling the cutting speed of the tool driven by an electric motor so that the in-feed speed is hastened when the difference of both the values of the detected cutting power and a predetermined cutting power is within a predetermined range and the value of the detected cutting power is larger than that of the predetermined cutting power, while the in-feed speed is lessened when the value of the detected cutting power is smaller than that of the predetermined cutting power so as to compensate the wear of the tool. This method is performed by an automatic grinding machine of a roll grinding machine which has a mechanism for compensating the wear of a grinding wheel, a mechanism for compensating the resilient deformations of a grinding wheel, wheel station and roll for controlling the position of the wheel station, means for rotating an electric motor for in-feeding the grinding wheel to cut in normal or reverse direction so as to increase or decrease the cutting, and means for controlling the rotation of the electric motor so as to be proportional to the amplitude of a signal obtained by the in-feed speed of the grinding wheel for compensating the resilient deformation of the grinding wheel, wheel station and roll.

6 Claims, 19 Drawing Figures

METHOD AND APPARATUS FOR CONTROLLING THE ACCURACY OF MACHINING OF A MACHINE TOOL

BACKGROUND OF THE INVENTION

This invention relates to a control method for improving machining accuracy and an apparatus therefor. More particularly, the invention relates to a method for correcting machining errors caused by the resilient deformation of a machine tool and tool wear and apparatus therefor.

The purpose of machining an article by a machine tool is to cut unnecessary projecting portion from the article. However, as the machine tool is not completely rigid, if a cutting force is applied to the machine tool, the respective portions of the machine tool are deformed. If the cutting force is varied, the amount of deformation is accordingly varied. Therefore, in general, an article to be machined varies in dimensions and shape. The dimensions of the respective portions of the article which are cut during the cutting step of the machining operation, are varied since the cutting force varied with the shapes of the respective portions. For this reason, even if the initial accuracy of the machine tool is correct, the irregular unnecessary portions of the material are not sufficiently cut or removed by the first cutting with the result that some of the irregular portions remain after the cutting.

In a machine tool comprising a conventional cutting tool and cutter, since the amount that the machine tool is deformed is smaller than the cut dimensions, it is possible to machine the product to a predetermined accuracy by cutting several times. This is usually done by providing rough cuts and than machining cuts. However, in grinding work using a grinding wheel, the dimensions to be ground as the grinding wheel passes once over the surface of the article are normally smaller than the cutting wheel drive dimensions toward the article to be ground (hereinafter called a cut or slotted dimension), and the greater part of the slotted dimensions are absorbed in the shape such as the deformations of the grinding machine, the article to be ground and the grinding wheel. For this reason, since the amount of material removed upon one pass of the grinding wheel over the irregular surface portions of the article is small, it is impossible to machine the product to a predetermined accuracy unless a grinding method of passing the grinding wheel over the surface of the article is adopted.

In the event that the article to be ground is massive and the machining area of grinding is broad, such as in the case of regrinding the roll of a rolling mill, this becomes uneconomical from the viewpoint of time and interference of grinding. Considering the regrinding of the roll, such a rolls are not defected uniformly by the rolling, with the result that it is most economical to so machine only the portions less defected so as to obtain a predetermined accuracy without grinding the most defected portion by the most defected portion as a standard. However, since there exist the deformations of the grinding wheel and the article to be ground by the normal grinding method as aforementioned, a predetermined accuracy, that is, a circularity or cylindricity cannot be obtained unless the most defected portion is further cut slightly. This is uneconomical because it increases the amount of regrinding in comparison with the method of obtaining a predetermined circularity of cylindricity without grinding the most defected portion.

It most be considered in the grinding work by the grinding wheel that the grinding wheel wears considerably and generally to a much greater extent that a cutting tool, cutter, etc. As to this point, there is disclosed by Japanese Patent Publication No. 8309/69 that the reduction of the in-feed amount due to grinding wheel wear is corrected by the cutting of the grinding wheel so as to automatically maintain the in-feed amount over a predetermined value. However, since this invention has a characteristic to maintain the in-feed amount over a predetermined value, it has the disadvantage of increasing the regrinding amount until it is finished to a predetermined accuracy so that the most defected portion of the roll is maintained at the in-feed amount over a predetermined value.

On the other hand, in a machine tool, heretofore, when the effect of the resilient deformation of the tool station for edge of blade on the accuracy of machining is not ignored due to the requirement of high accuracy of machining, and when the material must be ground in short time even if the resilient deformation of the grinding wheel is very large, in order to remove such resilient deformation or to overcome such disadvantages, the rigidity of the machine tool is enhanced, or the repetition of the same machining steps is conducted many times in a grinding machine.

However, it is uneconomical in the viewpoint of the rigidity and the number of times the grinding steps are repeated by the remedy for the resilient deformation only by such methods at present when the higher accuracy of finishing or machining of the material with a predetermined accuracy in short time is increasingly required.

SUMMARY OF THE INVENTION

This invention eliminates the aforementioned disadvantages of conventional machine tools and has an object to provide a control method for controlling automatic roll grinding to obtain a required machining accuracy with a minimum of regrinding.

It is another object of this invention to provide a control method to resiliently compensate finishing accuracy in a machine tool.

It is a further object of this invention to provide an apparatus for performing the aforementioned method.

The method of this invention comprises the following steps:

1. A control step for machining a product to a predetermined accuracy depending upon small in-feed amounts by preventing the excessive in-feed of the portion having the smallest interference by varying the cutting speed to compensate for tool wear in response to a change in the cutting power.

2. A control step for adapting for stable operation the control set forth in the above paragraph (1) even when the wear characteristics of the grinding wheel are varied due to the loading of the grinding wheel.

3. Two steps of correcting for resilient deformation of the grinding machine, the article to be ground and grinding wheel upon assumption thereof by the grinding power in a grinding machine.

According to one aspect of this invention, there is provided a control method for improving machining accuracy comprising the steps of detecting the cutting power of a machine tool, comparing the value of the detected cutting power with a predetermined value of cutting power, and controlling the in-feed speed of the tool, driven by an electric motor, so that the speed is increased when the difference between the values of the detected cutting power and the predetermined cutting power is within a predetermined range and the value of the detected cutting power is larger than that of the predetermined cutting power, while the in-feed speed is reduced when the value of the detected cutting power is smaller than that of the predetermined cutting power so as to compensate the wear of the tool.

According to another aspect of this invention, there is provided a method for resiliently compensating machining accuracy which comprises the steps of detecting the amount of resilient deformation of a tool and station for supporting the tool during machining, and controlling the in-feed amount of the tool and station for supporting the tool, toward the article to be machined, by the detected signal in such a manner that when the detected signal is larger than a preset value, it is directed toward the article to be machined, while conversely when the detected signal is smaller than the preset value, it is directed away from the article to be machined.

According to a further aspect of this invention, there is provided an apparatus for automatically cutting an article which comprises a machanism for compensating for the wear of a grinding wheel, a machanism for compensating for the resilient deformation of a grinding wheel, wheel station and roll for controlling the position of the wheel station, means for rotating an electric motor for feeding the grinding wheel in normal or reverse direction so as to increase or decrease the cutting, and means for controlling the rotation of the electric motor so as to be proportinal to the amplitude of a signal obtained by the in-feed speed of the grinding wheel for compensating the resilient deformation of the grinding wheel, wheel station and roll.

BRIEF DESCRIPTION OF THE DRAWINGS

The features and advantages of this invention will become apparent from the following description taken in conjunction with the accompanying drawings, in which.

DESCRIPTION OF THE PREFERRED EMBODIMENTS

Figure 1:
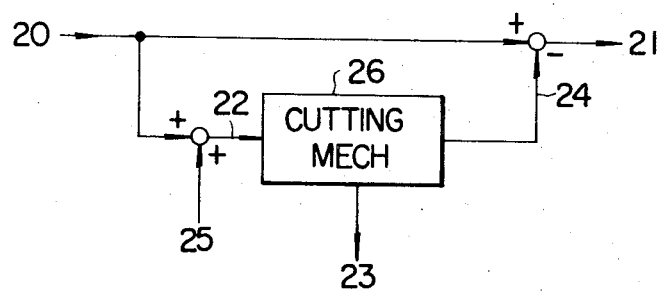
FIG. 1 is a block diagram of a in-feed mechanism for explaining the transmission of the error.

FIG. 1 shows a in-feed mechanism and will be used to explain the transmission of the error. Numeral 20 illustrates the difference of the shape of the material and the shape of the product to be obtained by machining, that is, the error of the shape of the material, 21 the difference of the machined shape of the machined article and the shape of the product to be obtained, that is the error of the machined shape, 25 a constant in-feed amount given to the station for the edge of the machine tool with respect to the error of the shape of the material, that is the machanical in-feed amount, 22 a total in-feed amount, 26 a cutting mechanism, 23 a cutting power, 24 and in-feed amount.

In FIG. 1, it is assumed that the mechanical in-feed amount 25 is kept constant. In this state, if the error 20 of the shape of the material is varied, the total in-feed amount 22 also varies in response thereto, and further in cooperation therewith, the cutting power 23 and the in-feed amount 24 are also varied through the cutting mechanism 26. In this case, assuming that the machine tool, article to be machined and tool, etc., are completely rigid bodies so that their shapes are not varied by the load and the tool does not wear, the in-feed amount 24 cancels the material shape error 20 so that the error 21 of the finished shape becomes 0 whereby the machined article assumes the desired shape.

However, in actual machining, since the in-feed amount 24 is less than the total in-feed amount 22 due to resilient deformation and wear of the cutting tool, it is impossible to completely cancel the error 20 in the material shape by the cutting amount 24, and some of the reduction of the cutting amount due to the wear appears on the finished surface as the error 21 of the finished shape.

Figure 2:
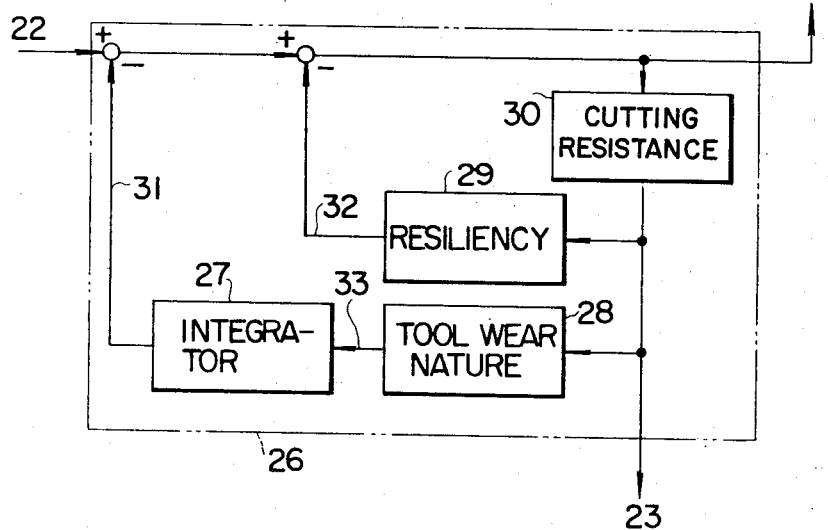
FIG. 2 is a block diagram of the in-feed mechanism for the explanatory purpose of the interior thereof shown in FIG. 1.

As to the cutting mechanism 26 shown in FIG. 1, the actual phenomenon may be well explained by considering the interior thereof as shown in FIG. 2. That is, the remainder obtained by substracting the wear amount 31 of the tool and the uncut amount due to the resilient deformation (which will be hereinafter called 'resilient uncut amount') 32 from the total in-feed amount becomes the in-feed amount 24. The cutting power 23 varies with respect to the size of the in-feed amount 24. Further, the resilient uncut amount 32 and tool wear rate 33 vary with respect to the amplitude of the cutting power 23. The tool wear rate 33 is integrated over time by the integrator 27 to become the tool wear amount 31. That is, the transfer function of the integrator 27 is expressed as 1/S (where S is a Laplace operand) showing that the signal is integrated. Here, the relation of the cutting power with respect to the in-feed amount 24 is called the cutting resistance 30 and the relation of the tool wear rate 33 with respect to the cutting power 23 is called tool wear nature 28.

Figure 3:
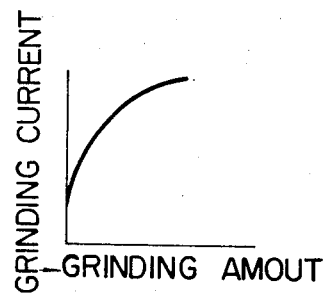
FIGS. 3 to 5 are graphs showing the cut resistance, resiliency and wear nature of the tool as one example shown in FIG. 2.
Figure 5:
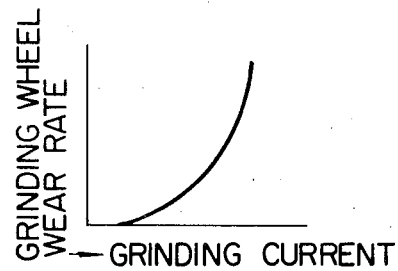

In roll grinding, the cutting power 23 is representatively expressed by the armature current of the DC motor for driving the grinding wheel. This will hereinafter be called a grinding current. Further, as a result of our research concerning the characteristics of the cutting resistance 30, resiliency 29 and tool wear nature 28 by grinding tests in roll grinding, the relationships shown in FIGS. 3 and 5 are obtained.

In FIG. 2, if the cutting resistance 30 is small, the cutting power is also small, and both the resilient uncut amount 32 and tool wear amount 31 also becomes small with the result that the error of the machined shape 21 becomes small. Even if the cutting resistance 30 is large, the rigidity of the machine tool and tool are strong and the resilient deformation thereof is small, and yet if the tool wear nature 28 is small, the error 21 of the machined shape also becomes small.

However, in roll grinding, since any of the cutting resistance 30, resiliency 29 and tool wear nature 28 is large, if there exists the error 20 of the shape of the material, this is presented as the error 21 of the machined shape as it almost is.

Figure 6:
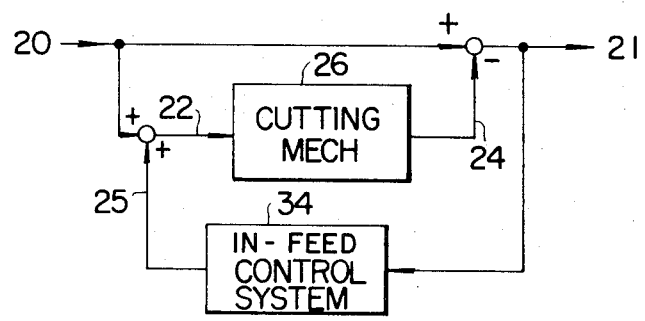
FIG. 6 is a block diagram of automatic in-feed control series in general.

If it is considered that the in-feed amount is controlled generally by the art of automatic control so as to lessen the error 21 in the machined shape, the control system shown in FIG. 6 may be considered. This control system controls the mechanical in-feed amount 25 by detecting the error 21 of the finished shape. According to this control system, in order to lessen the error 21 in the machined shape, the gain of the in-feed control system 34 is set sufficiently large. However, the error 21 of the machined shape is not detected at all at the cutting point so that it may be only performed by the method of time delayed detecting with the result that the in-feed control system 34 is responsive to the characteristics which include the loss time factor of its open loop characteristics to cause hunting if the gain is raised.

Figure 7:
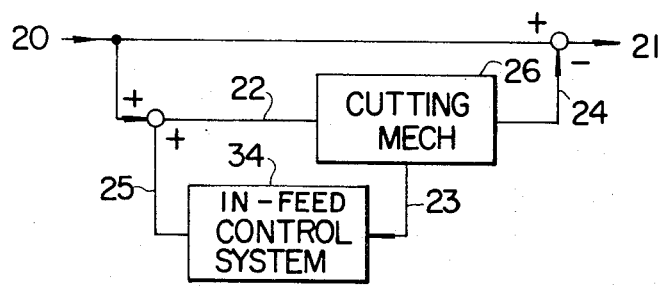
FIG. 7 is a schematic block diagram of the in-feed control system according to this invention.

FIG. 7 is a block diagram of the in-feed control system 34 according to this invention. As to the points different from that shown in FIG. 6, the error 21 of the finished shape is made as a feedback signal in FIG. 6, while the cutting power 23 is detected and used for control purposes in the present invention. The time delay for detecting the cutting power 23 may be shortened to one several tenth in comparison with the time delay for detecting the error 21 of the finished shape, with the result that the control of this invention may become easy correspondingly so that the error of the control may be lessened.

Figure 8:
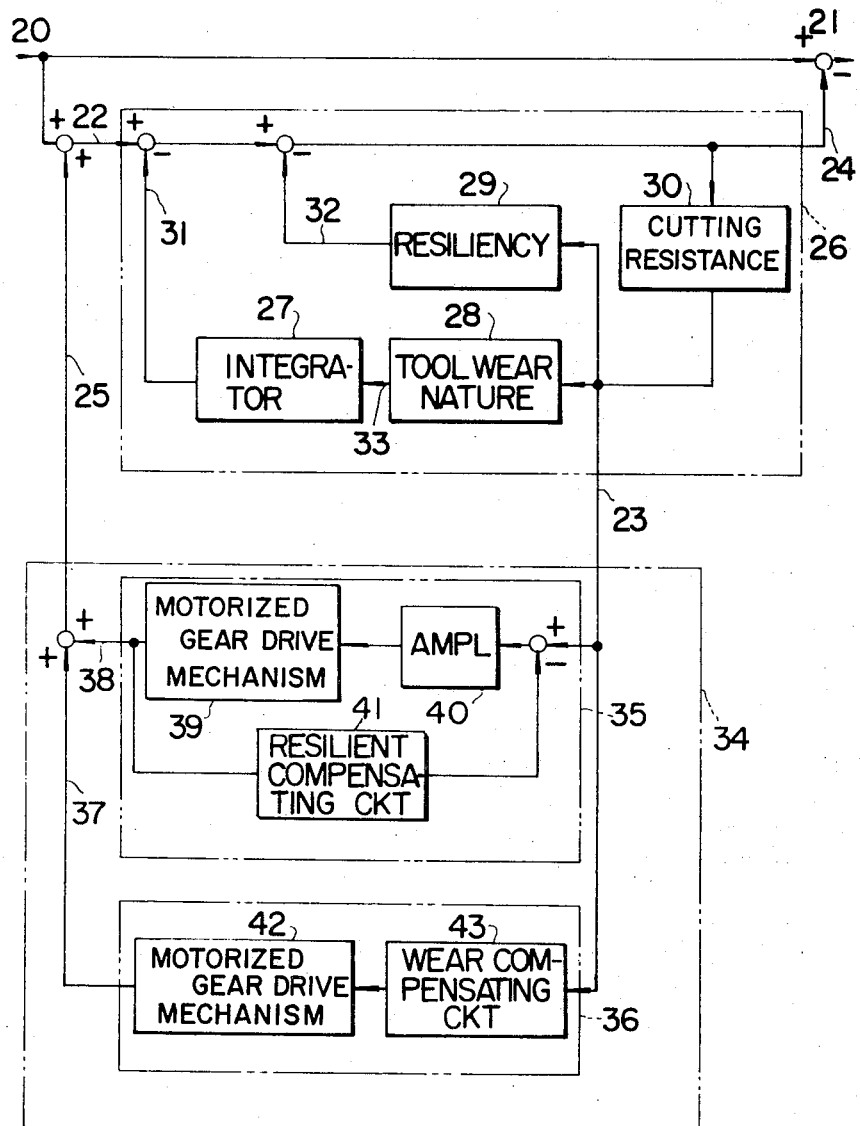
FIGS. 8 and 9 are a detailed block diagram of the example shown in FIG. 7.

FIG. 8 shows a block diagram of one method of in-feed control according to this invention. The in-feed control system 34 is composed of in-feed control device 35 for compensating resiliently and the in-feed control 36 for compensating for the wear. The characteristics of the resilient compensating circuit 41 in FIG. 8 simulates to the inverse function of the characteristics of the resiliency 29 of the cutting mechanism 26. The characteristics of the wear compensating circuit 43 similates to the characteristics of the tool wear nature 28. The two in-feed control devices 35 and 36 include an electric motor, gear drive system and feed screw or cam to have a characteristic for integrating the fundamental signal. The motorized gear drive mechanism of the control devices 35 and 36 are designated by 39 and 42. The transfer function of the characteristics 39 and 42 are expressed as 1/S (wherein S is Laplace's operand). An amplifier 40 amplifies the difference signal between the cutting power 23 and the output of the resilient compensating circuit 41 so as to rotate the motor included in the in-feed control device 35 proportional to the output thereof. The in-feed amount produced by the in-feed control device 35 is detected by the resolver, potentiometer, etc., provided in the gear drive system to be as the input of the resilient compensating circuit 41. If the mu-factor of the amplifier 40 is sufficiently large, the characteristics of the in-feed amount 38 of the in-feed control device 35 with respect to the cutting power 23 approaches the characteristics of the resiliency 29 of the cutting mechanism 26 with the result that the in-feed amount 38 of the in-feed control device 35 cancels almost the resilient uncut amount 32. Further, the characteristics of the in-feed amount 37 of the in-feed control device 36 of the cutting power 23 approaches the characteristics that the tool wear rate 33 of the cutting mechanism 26 becomes, when the tool wear amount 31 is integrated by the integrator 27, with the result that the in-feed amount 37 of the in-feed control device 36 almost cancels the tool wear amount 31. If these cancellations are complete, the affection of the variation of the cutting power 23 to the in-feed amount 24 becomes zero so that the error 21 of the finished shape is not present. However, in the actual control system, the cancellation is not complete due to the delay in the detection of the cutting power 23, the error in the approximation of the resilient compensating circuit 41, timing delay in amplifier 40, lack of gain, approximate error in the wear compensating circuit 43, etc., and thus a slight error 21 is present in the finished shape.

However, if this is compared with the case when the in-feed control is not conducted, it is a very small value so that finishing accuracy is greatly improved.

Figure 9:
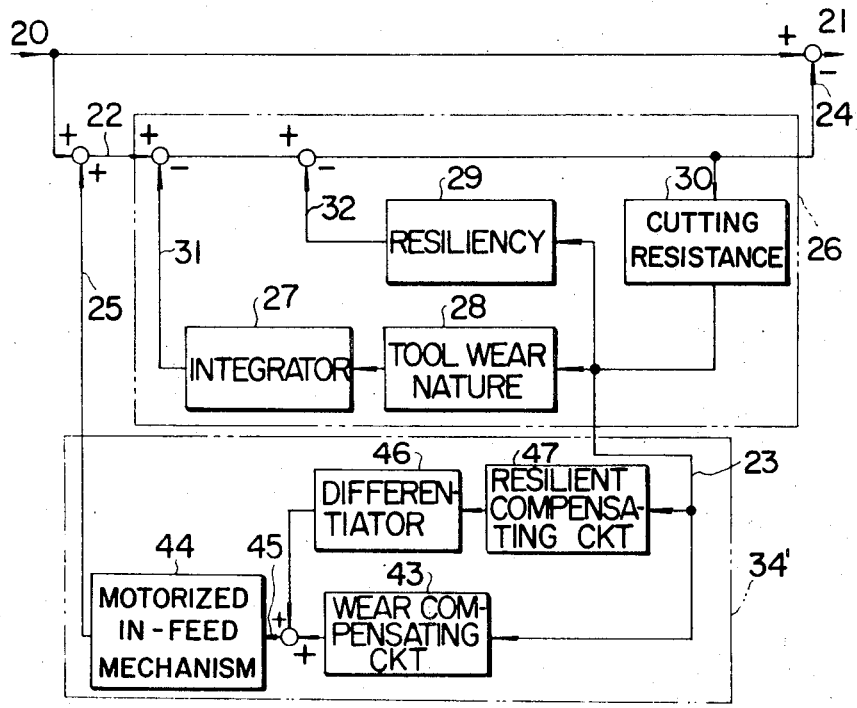

FIG. 9 is a block diagram showing another in-feed control device according to this invention. This has a feature that it has one in-feed control device in comparison with that shown in FIG. 8. According to this method, it is not necessary that the in-feed amount is always remoted. These points simplify the structure of the machine tool and control device as compared with the device shown in FIG. 8 and thus the device of FIG. 9 can be manufactured less expensively. The characteristics of the resilient compensating circuit 47 of the in-feed control system 34 in FIG. 9 corresponds to that of the resiliency 29 of the cutting mechanism 26, and similarly the characteristics of the wear compensating circuit 43 corresponds to that of the tool wear nature 28.

The output signal from the resilient compensating circuit 47 is differentiated with respect to time by differentiator 46, and thereafter is united with the output of the wear compensating circuit 43. The signal on line 45 represents the in-feed speed and is proportional to the sum of the outputs from the differential 46 and wear compensating circuit 43. The in-feed speed is integrated with respect to time to become the in-feed amount 25. The motorized in-feed mechanism between the in-feed speed 45 and the in feed amount 25 is expressed by 44. The transfer function of the characteristics 44 is expressed by 1/S (wherein S is Laplace's operand). After the output signal of the resilient compensating circuit 47 is differentiated by the differentiator 46, it is integrated in integrator 44 having the above described characteristics with the result that the effect of the differentiation and that of the integration are cancelled so that the in-feed amount 25 cancels the resilient uncut amount 32.

Figure 10:
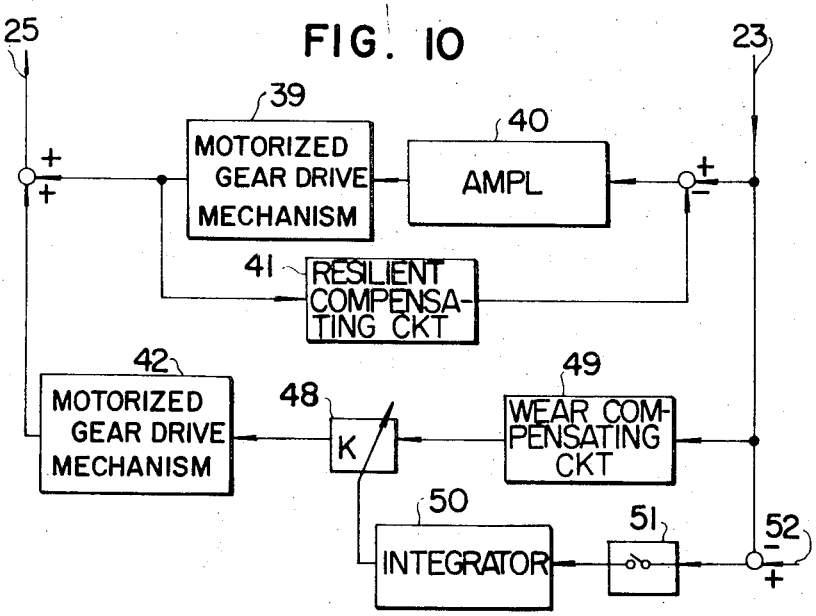
FIGS. 10 and 11 are block diagrams of the system for control of the adaptability to the in-feed control system shown in FIGS. 8 and 9.
Figure 11:
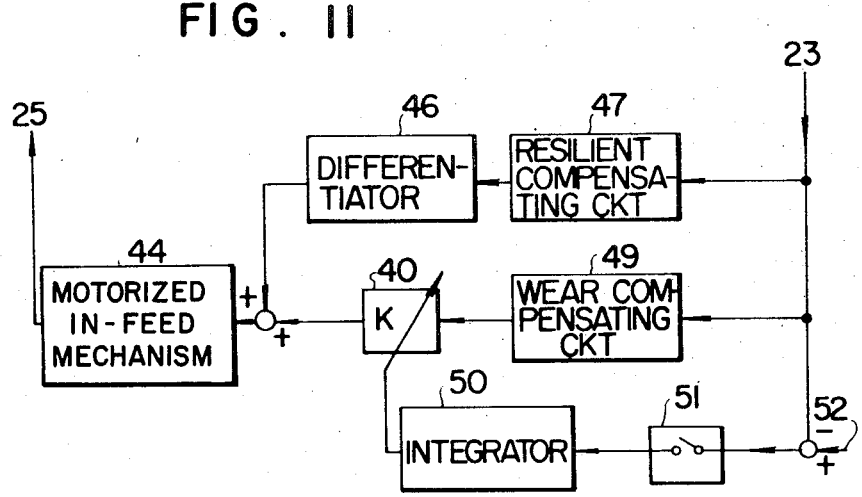

Thus, the control shown in FIG. 9 in a manner similar to the manner of operation of the control shown in FIG. 8. In addition, generally the characteristics of the tool wear nature 28 tends to vary during cutting in comparison with the characteristics of the resiliency 29. With respect to roll grinding, the reduction of the grinding wheel is varied by its loading. In the in-feed control system 34 shown in FIGS. 8 and 9, when the characteristics of the tool wear nature 28 is changed, if the characteristics of the wear compensating circuit 43 is not varied, the cancellation of the tool wear amount 31 becomes corresponding incomplete with the result that the error 21 of the machined shape is not increased, but is accumulated gradually due to the motorized gear drive mechanism 42 and the motorized in-feed mechanism 44 or the integrator 27, and then finally becoming impossible to cut. To prevent this problem, the system for controlling the adaptability to the in-feed control system is shown in FIGS. 10 and 11. In FIGS. 10 and 11 compensating circuit 43 is replaced with a new wear compensating circuit 49 and there is provided a coefficient multiplier 48 (its coefficient is K) immediately thereafter. A preset load 52 is added thereafter to the in-feed control system 34 shown in FIGS. 8 and 9. The characteristics of the wear compensating circuit 49 corresponds to that of the tool wear nature 28 divided by the value of the coefficient K. When the tool wear nature 28 is decreased due to a variation in the loading of the grinding wheel, if the characteristics of the wear compensating circuit 49 and the coefficient multiplier 48 (functionally equivalent to the wear compensating circuit 43 in FIGS. 8 and 9) is not varied, since the infeed amount 25 cancels the tool wear amount 31 still positive, with the result that the in-feed amount 25 is increased gradually to increase the cutting power 23. The cutting power 23 closes a sampling gate 51 at a proper time during cutting, in comparison with the preset load 52 as a standard value, so as to correct the value K of the coefficient multiplier 48 through the integrator 50. When the cutting power 23 is increased, the value K of the coefficient multiplier 48 is reduced, while when the cutting power 23 is decreased, the value K of the coefficient multiplier 48 is increased. The time point for closing the sampling gate 51 is so selected as to select the time point for cutting the portion which is relatively stable of the shape of the material in case of roll grinding such as the case that the grinding wheel reaches both ends of the roll drum. After correcting the coefficient, cutting is conducted such that the cutting power becomes equal to the preset load by a circuit not shown in the drawing so as to open the sampling gate 51, and then the above operations are repeated again.

Figure 12:
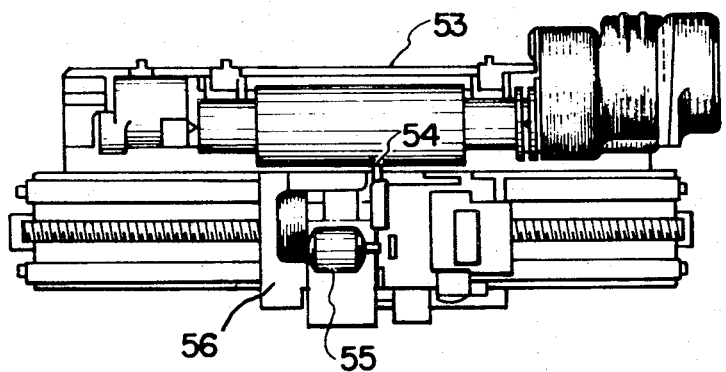
FIG. 12 is a plan view of the toll grinding machine exemplified according to this invention.

FIG. 12 is a plan view showing the state that the roll to be cut 53 is rested on the grinding machine, the grinding wheel 54 is driven by the electric motor 55 for driving the grinding wheel to reciprocate in the longitudinal direction of the roll by the reciprocal station 56.

Figure 4:
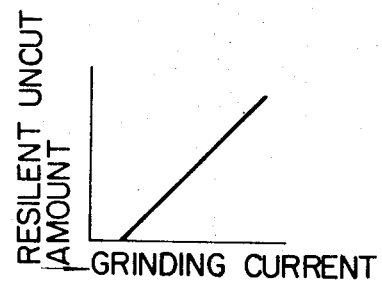
Figure 13:
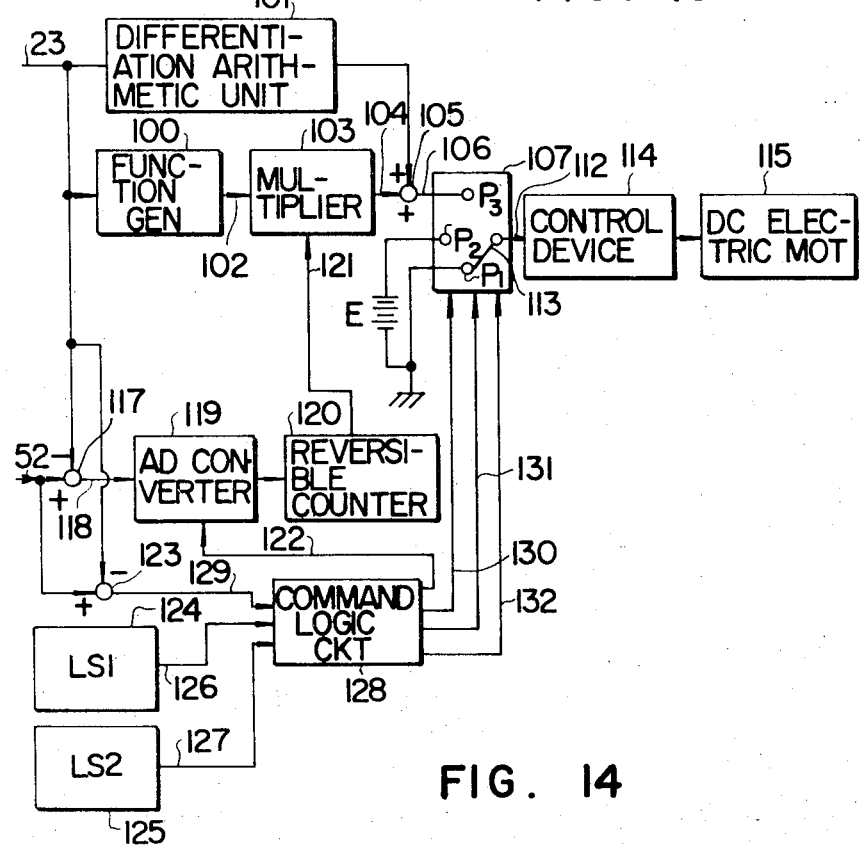
FIG. 13 is a block diagram of the in-feed control circuit exemplified according to this invention.
Figure 14:
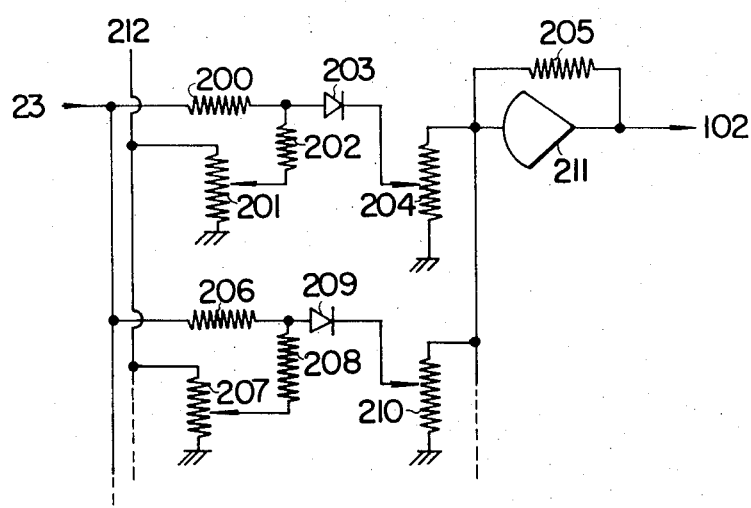
FIG. 14 is a wiring diagram of an embodiment of the function generator in FIG. 13.
Figure 15:
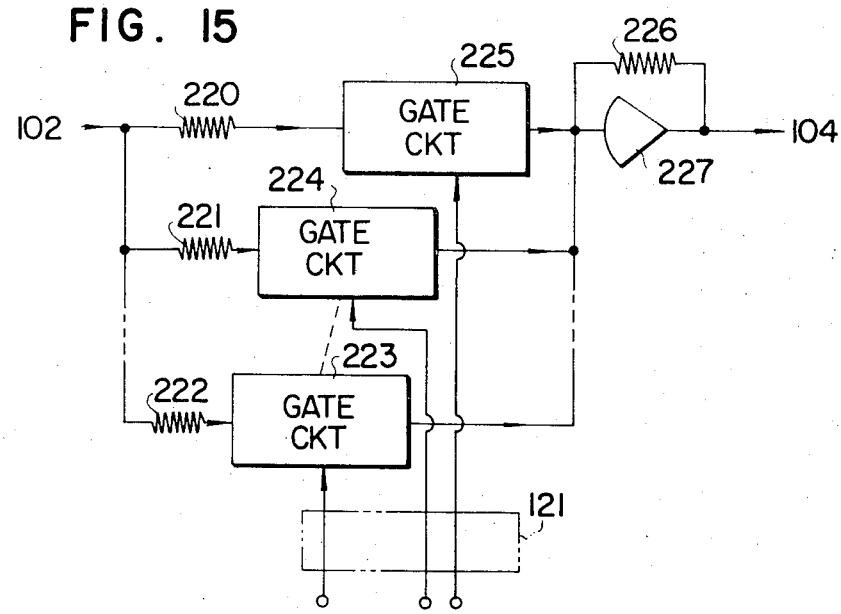
FIG. 15 is a wiring diagram of the embodiment of the multiplier in FIG. 13.

FIG. 13 is a block diagram of the control device required when the in-feed control system shown in FIG. 1 is connected to the grinding machine to control its operation. 23 is an analog voltage signal representing a measured value of armature current (hereinafter called 'grinding current') of the electric motor 55 used to drive the grinding wheel. The preset load 52 is a standard voltage power supply as an objective value of the grinding current similar to the in-feed amount setting portion 15 shown in FIGS. 3 and 4 of Japanese Patent Publication No. 222948/68 for example. Numeral 100 is a function generator generating a signal simulating the wear characteristics of the grinding wheel which perform with a polygonal line similar function generator such as being the functions generator output 102 with the cutting power 23 as an input of the analog signal voltage in FIG. 14, for example. In FIG. 14 numerals 200, 202, 205, 206 and 208 illustrate fixed resistors 201, 204, 207 and 210 variable resistors, 203 and 209 diodes, 211 an an operational amplifier, 212 a DC constant voltage source. In FIG. 13, 103 is a multiplier which multiplies the function generator output 102 and a signal 121. Multiplier 103 may be the analog digital multiplier shown in FIG. 15. In FIG. 15, 220, 221 and 222 are fixed resistors, and signal 121 is composed of the group of binary signal lines forming the output K of the reversible counter 120 in FIG. 13, wherein the respective signal lines of the same 121 becoming the date signal of the gate circuits 223, 224 and 225. Further, a comparator 117 compares the cutting power 23 with the preset load 52 to produce an analog voltage signal on line 118. Further, a logic comparator 123 compares the preset load 52 with the cutting power 23 to produce a logic signal on line 129. The embodiments of the comparator 117 and the logic comparator 123 are shown in FIG. 16.

Figure 16:
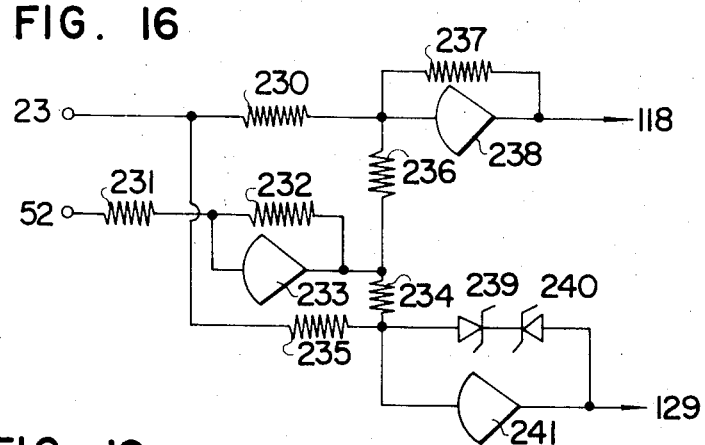
FIG. 16 is a wiring diagram of the comparator 117 and logic comparator 123 shown in FIG. 13.

In FIG. 16, numerals 230, 231, 232, 234, 235, 236 and 237 are resistors, 233, 238 and 241 are operational amplifiers, 239 and 240 are zener diodes.

Figure 18:
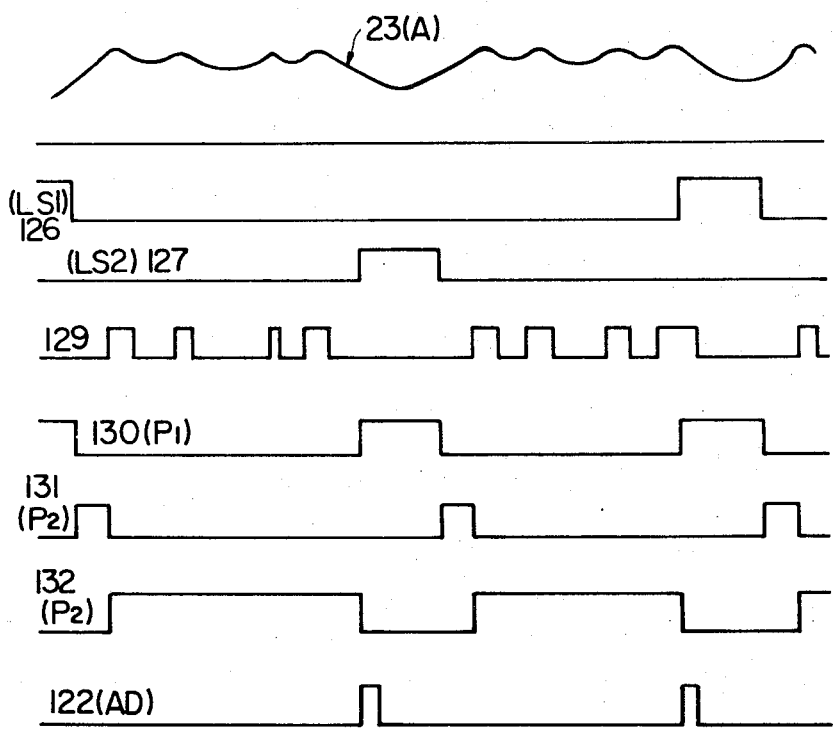
FIG. 18 is an explanatory view of the operation of the respective signals shown in FIG. 17.

Limit switch (LS1) 124 and limit switch (LS2) 125 in FIG. 13 are used for limiting both the right and left strokes of the reciprocal station 56 in FIG. 12, and are controlled so that overall the drum of the roll 53 is reciprocally moved in the longitudinal direction by the grinding wheel 54 by a control circuit (not shown) and both the limit switches. Further, in FIG. 13, the command logic circuit 128 is operated by the logic signal 129 of the logic comparator 123, output signals 126 and 127 of the limit switches LS1 and LS2. Referring to FIG. 18, the logic operation is as follows: (1) In FIG. 13 if the reciprocal station 56 is disposed at the stroke limit, and either of the limit switches LS1 and LS2 is operated, the command logic circuit 128 feeds out a P1 signal 130 so that the contact 113 is moved into contact with the first contact P1 of the gate circuit 107. (2) When the reciprocal station 56 starts to move so that both the limit switches LS1 and LS2 do not operate, the command logic circuit 128 feeds out a P2 signal 131 causing contact 113 in the gate circuit 107 to move from the first contact P1 to the second contact P2. (3) When the contact 113 is in contact with the second contact P1, if the logic comparator 123 produces the logic signal 129 showing that the cutting power is equal to or larger than the preset load 52, the command logic circuit 128 feeds out the P3 signal 132 causing the contact 113 in the gate circuit 107 to move into contact with the third contact P3 (4) If the command logic circuit 128 senses that either of the limit switches LS1 and LS3 is operated so that the reciprocal station 56 reaches the stroke limit, the command logic circuit 129 feeds out the P1 signal causing the contact 113 to move into contact with the first contact P1. At the same time, the command logic circuit 128 produces an operation pulse 122 for the analog digital converter 119, which will be hereinafter called AD converter.

Figure 17:
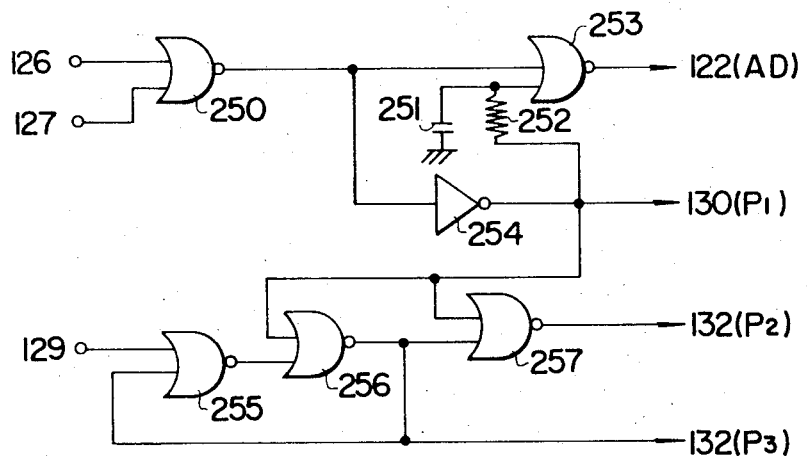
FIG. 17 is a wiring diagram of the embodiment of the command logic circuit 128 in FIG. 13.

Further, FIG. 17 illustrates one embodiment of the command logic circuit 128 wherein it is composed of logic NOR elements, FIG. 18 is used to help describe the operation of the circuit of FIG. 17.

In FIG. 17, numerals 250, 253, 255, 256 and 257 illustrate NOR elements, 251 a condenser, 252 a resistor, and 254 an inverter.

In FIG. 13, and AD converter 119 produces a train of a predetermined number of pulses in response to an operation pulse 122 received from the command logic circuit 128. In this case, the number of positive and negative pulses will vary depending upon the polarity and amplitude of the analog voltage signal on line 118. Further, a reversible counter 120 discriminates the positive and negative pulses obtained from the AD converter 119 so as to add or substrate the pulses obtained from the AD converter 119 from its stored contents. It also memorizes the new result and produces the signal 121 representing the stored contents of the counter which is applied to the multiplier 103.

Figure 19:
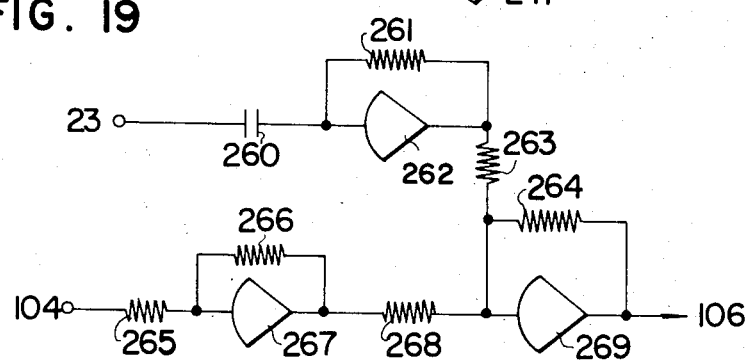
FIG. 19 is a wiring diagram of the embodiment of the adder 105 shown in FIG. 13.

Furthermore, in FIG. 13, numeral 101 illustrates a differentiation arithmetic unit and 105 an anlog adder. The embodiments of the differentiation arithmetic unit 101 and the analog adder 105 are shown in FIG. 19. In FIG. 19, numeral 260 is a condenser, 261, 263, 264, 265 and 266 and 268 resistors, 262, 267 and 269 are operational amplifiers.

In FIG. 13, 107 is a gate circuit responsive to signals from the command logic circuit 128, and its operation was described in the description with reference to the command logic circuit 128. Further, 115 is a DC electric motor of low inertia for cutting, and is controlled so as to rotate at a speed proportional to the output voltage of the gate circuit 107. The rotation of the low inertia DC motor 115 for cutting is transmitted through a gear train (not shown) to the cutting feed female screw, and in FIG. 12, moves the grinding wheel 54 toward the roll 53 to be cut.

Further, in FIG. 13, numeral 116 is a constant voltage power supply producing E volts used to provide a standard signal source for causing a constant speed rotation of the electric motor 115 to move the grinding wheel toward the cutting direction when the contact 113 of the gate circuit 107 is in contact with the second contact P2 109.

Operation of the above described apparatus will now be described.

In FIG. 13, when the grinding wheel 54 is disposed at the end of the roll 53 so that the limit switch LS1 or LS2 is operating, the contact 113 of the gate circuit 107 is caused to contact the first contact P1 with the result that the input to the control device 114 becomes zero. Accordingly, the DC motor 115 of low inertia for cutting will not produce cutting as it is stopped.

When the grinding wheel 54 is moved longitudinally, the operating limit switch LS1 or LS2 is reset. Thereby, the contact 113 of the gate circuit 107 is transferred from the first contact P1 to the second contact P2. The input side of the control device 114 is connected to a constant voltage power supply 116 so that a constant voltage is supplied with the result that the DC motor 115 rotates at a constant speed, so as to cause cutting at a constant speed. As it is cutting, the cutting power 23 is increased. If the cutting power 23 is equal to or larger than the preset load 52, the logic comparator 123 is operated so that its signal 129 operates the command logic circuit 128, with the result that contact 113 of the gate circuit 107 is transferred from the contact P2 to the third contact P3. In this state, the control system becomes equivalent to that shown by the cutting control system 34 in FIG. 9 so as to conduct the resilient compensation and wear compensation to grind it.

Moreover, when the grinding wheel 54 reaches the longitudinal feeding limit so that the limit switch LS1 and LS2 is set, the command logic circuit 128 will feed a command pulse 122 to the AD converter 119, whereupon, if the cutting power 23 is higher than the preset load 52, it feeds the pulses corresponding thereto to the reversible counter 120 so that the reversible counter 120 reduced its contents K. Conversely, if the cutting power 23 is lower than the preset load 52, the constant K of the reversible counter 120 is increased. If the diameters at both ends of the material roll are equal, the characteristics of the wear compensation is improved in the direction that it coincides with the characteristics of the tool wear nature 28 of the cutting mechanism 26 in FIG. 9. Further, if there exists a difference between the diameters of the both ends of the material roll, when it is cut from the end smaller in diameter toward the end larger in diameter by the conversion of the K, it compensates the wear excessively than the tool wear nature 28 of the cutting mechanism 26, while when it is cut from the end large in diameter toward the end small in diameter, it compensates the wear smaller than the tool wear nature 28 of the cutting mechanism 26. Thus, the end large in diameter of the material roll is cut more excessively than the end small in diameter so that the diameters of both ends of the material roll are improved toward the direction gradually coinciding.

As the foregoing description, the number of grinding strokes required heretofore for finishing the circularity of cylindricity of the grinding roll to a required accuracy is greatly decreased by applying this invention to an automatic grinding machine of a roll grinding machine and accordingly, the regrinding amount is also lessened, with respect to which the diameter of the roll is not so lessened unnecessarily so as to lengthen the lift of the roll. And, since it finishes the roll regrinding in short time, a great advantage is provided for the rolling work by the rolls.

What is claimed is:

1. A method of improving the machining accuracy of a machine tool comprising the steps of:
    detecting the cutting power of the machine tool;
    comparing a value of the detected cutting power with a preset value of cutting power; and
    controlling the rotating speed of an electric motor for giving an in-feed to the tool so that said rotating speed of the motor is increased when the difference between both values of cutting power is within a predetermined range and the value of the detected cutting power is larger than the preset value of cutting power, and said rotating speed of the motor is decreased when the difference between said both values is within the predetermined range and the value of the detected cutting power is smaller than the preset value of cutting power, whereby the wear of the tool is compensated during the machining operation.

2. A method of improving the machining accuracy in a traverse grinding work of a roll grinding machine comprising the steps of:

giving an in-feed to a grinding wheel until the grinding current of an electric motor driving the grinding wheel reaches a predetermined grinding current at the starting point of the traverse grinding work;

compensating for the wear of the grinding wheel during the traverse grinding work by:

detecting the grinding power of the grinding wheel;
comparing a value of the detected grinding power with a preset value of grinding power; controlling the rotating speed of an electric motor giving said in-feed to the grinding wheel so that said rotating speed is increased when the difference between both said values of grinding power is within a predetermined range and the value of the detected grinding power is larger than the preset value of grinding power, and said rotating speed of the motor is decreased when the difference between said both values is within the predetermined range and the value of the detected grinding power is smaller than the preset value of grinding power, whereby the wear of the grinding wheel is compensated during the traverse grinding work;

comparing the grinding current with said predetermined grinding current at the end of the traverse grinding work, controlling said grinding current so that the rate of compensation of the wear of the grinding wheel is controlled by reducing said grinding current when the grinding current is larger than said predetermined grinding current, and by increasing said grinding current when the grinding current is smaller than said predetermined grinding current by providing a counter for conducting the calculation whereby the wear of the grinding wheel is compensated during the traverse grinding work.

3. A method of improving the machining accuracy of a machine tool comprising the steps of:

detecting the cutting power of a machine tool;
comparing a value of the detected cutting power with a preset value of cutting power; and
moving a tool and a tool carriage by an electric motor for giving an in-feed to the tool so that the tool and the tool carriage are directed toward a material to be machined when the difference between said both values of cutting power is within a predetermined range and the value of the detected cutting power is larger than the preset value of cutting power, and so that the tool and the tool carriage are directed away from the material to be machined when the difference between said both values is within said predetermined range and the value of the detected cutting power is smaller than the preset value of cutting power wereby resilient deformations of the tool, the tool carriage and the material to be machined are compensated.

4. A method of improving the machining accuracy of a machine tool comprising the steps of:

detecting the cutting power of a machine tool;
differentiating a value of the detected cutting power with respect to time, and controlling the in-feed speed of a tool by controlling the rotating speed of an electric motor for giving an in-feed to the tool so that said in-feed speed of the tool is proportional to an output of the differentiated cutting power, whereby resilient deformations of the tool, a tool carriage and a material to be machined are compensated.

5. An automatic grinding apparatus for use in a traverse grinding work of a roll grinding machine comprising:

a first electric motor for driving a grinding wheel;
a second electric motor for giving an in-feed to said grinding wheel;
means for controlling the grinding current of said first electric motor so that said grinding current becomes equal to a predetermined grinding current;

means for detecting said grinding current;
means for comparing a value of the detected grinding current with a preset value of grinding current;
means for controlling the rotating speed of said second electric motor so that said rotating speed is increased when the difference between both values of grinding current is within a predetermined range and the value of the detecting grinding current is larger than the preset value of grinding current, and so that said rotating speed is reduced when the difference between said both values is within the predetermined range and the value of the detected grinding current is smaller than the preset value of grinding current;

means for controlling the position of the grinding wheel and a grinding wheel carriage so that the grinding wheel and the grinding wheel carriage are directed toward a material to be ground when the difference between said both values is within a predetermined range and the value of the detected grinding current is larger than the preset value of grinding current, and so that the grinding wheel and the grinding wheel carriage are directed away from the material to be ground when the difference between said both values is within said predetermined range and the value of the detected grinding current is smaller than the preset value of grinding current; and means for controlling said grinding current so that the rate of compensation of the wear of the grinding wheel is controlled by reducing said grinding current when the value of the detected grinding current is larger than said preset value of grinding current, and by increasing said grinding current when the value of the detected grinding current is smaller than the preset value of grinding current, whereby resilient deformations of the grinding wheel, the grinding wheel carriage and the material to be ground are compensated.

6. An automatic grinding apparatus for use in a traverse grinding work of a roll grinding machine comprising:

a first electric motor for driving a grinding wheel;
a second electric motor for giving an in-feed to said grinding wheel;
means for controlling the grinding current of said first electric motor so that said grinding current becomes equal to a predetermined grinding current;

means for detecting said grinding current;

means for comparing a value of the detected grinding current with a preset value of grinding current;

means for controlling the rotating speed of said second electric motor so that said rotating speed is increased when the difference between both values of grinding current is within a predetermined range and the value of the detected grinding current is larger than the preset value of grinding current, and so that said rotating speed is reduced when the difference between said both values is within the predetermined range and the value of the detected grinding current is smaller than the preset value of grinding current;

means for differentiating the value of the detected grinding current with respect to time;

means for controlling the in-feed speed of the grinding wheel by controlling the rotating speed of said second electric motor so that the in-feed speed of the grinding wheel is proportional to an output of the differentiated grinding current; and means for controlling said grinding current so that the rate of compensation of the wear of the grinding wheel is controlled by reducing said grinding current when the value of the detected grinding current is larger than the preset value of grinding current, and by increasing said grinding current when the value of the detected grinding current is smaller than the preset value of grinding current, whereby resilient deformations of the grinding wheel, the grinding wheel carriage and the material to be ground are compensated.

* * * * *